United States Patent [19]
Schröder et al.

[11] Patent Number: 4,942,607
[45] Date of Patent: Jul. 17, 1990

[54] METHOD OF TRANSMITTING AN AUDIO SIGNAL

[75] Inventors: Ernst Schröder, Hanover; Walter Voessing, Wennigsen, both of Fed. Rep. of Germany

[73] Assignee: Deutsche Thomson-Brandt GmbH, Villingen-Schwenningen, Fed. Rep. of Germany

[21] Appl. No.: 152,026

[22] Filed: Feb. 3, 1988

[30] Foreign Application Priority Data

Feb. 3, 1987 [DE] Fed. Rep. of Germany ....... 3703143

[51] Int. Cl.⁵ .......................... G10L 3/02; G10L 9/18; H04B 1/66
[52] U.S. Cl. ...................................... 381/31; 381/35; 381/37
[58] Field of Search ................................ 381/29–40, 381/47, 49

[56] References Cited

U.S. PATENT DOCUMENTS

| 3,875,341 | 4/1975 | Gassmann | 381/29 |
| 3,894,190 | 7/1975 | Gassmann | 381/29 |
| 4,388,491 | 6/1983 | Ohta et al. | 381/49 |
| 4,747,143 | 5/1988 | Kroeger et al. | 381/47 |
| 4,759,071 | 7/1988 | Heide | 381/47 |

FOREIGN PATENT DOCUMENTS 0145332 6/1985 European Pat. Off. .
3506912 8/1985 Fed. Rep. of Germany .
3310480 2/1986 Fed. Rep. of Germany .
3621513 1/1988 Fed. Rep. of Germany .

OTHER PUBLICATIONS

Zwicker, E., "Psychoakustik", pub. by Springer-Verlag Berlin Heidelberg, 1982, pp. 22–67.
Almeida et al., "Variable–Frequency Synthesis: An Improved Harmonic Coding Scheme", ICASSP 84, Mar. 19-21, 1984, pp. 1-4.
Un et al., "The Residual-Excited Linear Prediction Vocoder with Transmission Rate Below 9.6 Kbits/s", IEEE Trans. on Communications, COM 23, 1975, pp. 1466-1473.

Primary Examiner—Gary V. Harkcom
Assistant Examiner—David D. Knepper
Attorney, Agent, or Firm—Spencer & Frank

[57] ABSTRACT

A method of digital transmission of an audio signal, in which in order to save transmission and/or memory capacity, the digital signal is converted, before transmission, into signals representing the short-term spectrum of time sections of the digital signal and portions of this signal are processed on the basis of psycho-acoustic laws, with portions of this signal lying below given thresholds left unconsidered, with at least one first threshold being defined below which only amplitude values outside of psycho-acoustically differentiable frequency ranges are left unconsidered.

24 Claims, 3 Drawing Sheets

METHOD OF TRANSMITTING AN AUDIO SIGNAL

The present invention relates to a method of transmitting an audio signal wherein an analog signal is converted to a digital signal, is coded, is digitally transmitted and reconverted to an analog signal, with the signal being converted before transmission into a digital signal representing the short-term spectrum, and portions of this signal which lie below given thresholds are left unconsidered on the basis of psycho-acoustic laws during coding of the digital signal to be transmitted.

Such a method is disclosed already in DE-OS No. 3,506,912. With the aid of this method, it is possible to keep the required transmission bandwidth small and manage with a narrowband channel, transmit as many audio signals as possible simultaneously over an existing channel or utilize an existing mass memory as economically as possible. This is based on the realization that, due to the psycho-acoustic characteristics of the human ear, a listener is unable to discern all components of a sound reproduction, i.e., some of these components are irrelevant in a data transmission sense. These components, which would take up a considerable portion of the otherwise required transmission capacity, are omitted.

It has been found that the decision as to which components may be omitted requires the consideration of various criteria separately or in combination with other criteria. If such consideration is not made, the omission of certain components may lead to unsatisfactory sound experiences in certain unusual sound events.

SUMMARY OF THE INVENTION

It is therefore an object of the invention to provide a method of transmitting an audio signal in which a data reduction is made in such a manner that even for extraordinary sound events the sound experience is not worsened.

This is accomplished in a method of transmitting an audio signal in which an analog signal is converted to a digital signal, is coded, is digitally transmitted and reconverted to an analog signal, with the signal being converted, before transmission, into a digital signal representing the short-term spectrum, and portions of this signal which lie below given thresholds are left unconsidered on the basis of psycho-acoustic laws during coding of the digital signal to be transmitted wherein only the amount values of the short-term spectrum outside of psycho-acoustically differentiable frequency ranges are left unconsidered.

In the conversion of the signal into a signal representing the short-term spectrum, which is done by blockwise transformation, spectral components may occur which are not present in the long-term spectrum. The consideration of these spectral components during retransformation is important in order to again obtain a true image of the original signal. If the spectral components were suppressed in the course of data reduction, this would lead to a noticeable falsification of the sound offering.

However, one of the data reduction measures resides in suppressing spectral components having a value which lies below a given threshold or to leave it unconsidered. The basic reliability of this measure in view of the contradictory requirement for high reproduction quality resides in the psycho-acoustic masking effect. This masking effect is an inherent property of the human ear and the process of hearing. The human ear is acting similar to a spectral analyzer using about 26 band-filters distributed over the hearable frequency range from 20 Hz to 20 kHz. Within each of these frequency ranges any signal with magnitude of about 26 ... 30 dB lower than the maximum signal in the same range cannot be detected by the ear and is therefore said to be "masked". As these signals do not contribute to the sensation of a certain sound they do not have to be transmitted.

It has now been found that this masking effect cannot always be utilized if spectral components are affected by the suppression which were additionally produced in the short-term spectrum as a result of blockwise transformation. This is true even if the spectral components lie below the threshold at which the suppression of other spectral components would not result in an audible loss of quality.

It would be desirable if the additional spectral components produced by blockwise transformation could be distinguished from the others so that it would be possible to group them into "relevant" and "irrelevant" spectral components. But this is not the case.

Therefore, suppression of spectral components must be limited in those frequency ranges in which a masking effect is no longer reliably ensured. To nevertheless be able to maintain data reduction by suppression of certain low value spectral components, this measure is implemented below a first defined threshold only in frequency ranges which lie outside of psycho-acoustically differentiable frequency ranges.

A further feature of the invention provides for concrete frequency ranges in which the masking effect does not reliably become effective and therefore the suppression of spectral components could be disadvantageous. This refers, on the one hand, to the low frequency range below about 1 kHz and, on the other hand, to the immediate vicinity of the greatest spectral component of the audio signal. The mention of the latter frequency ranges is based on the realization that this is where the "relevant" spectral components occur with particularly high probability and their suppression has a quality reducing influence even if their amounts lie far below the given threshold.

BRIEF DESCRIPTION OF THE DRAWING

These and other features and advantages of the invention will be better understood from the following detailed description a the accompanying drawings, in which.

DESCRIPTION OF THE PREFERRED EMBODIMENT

Figure 1:
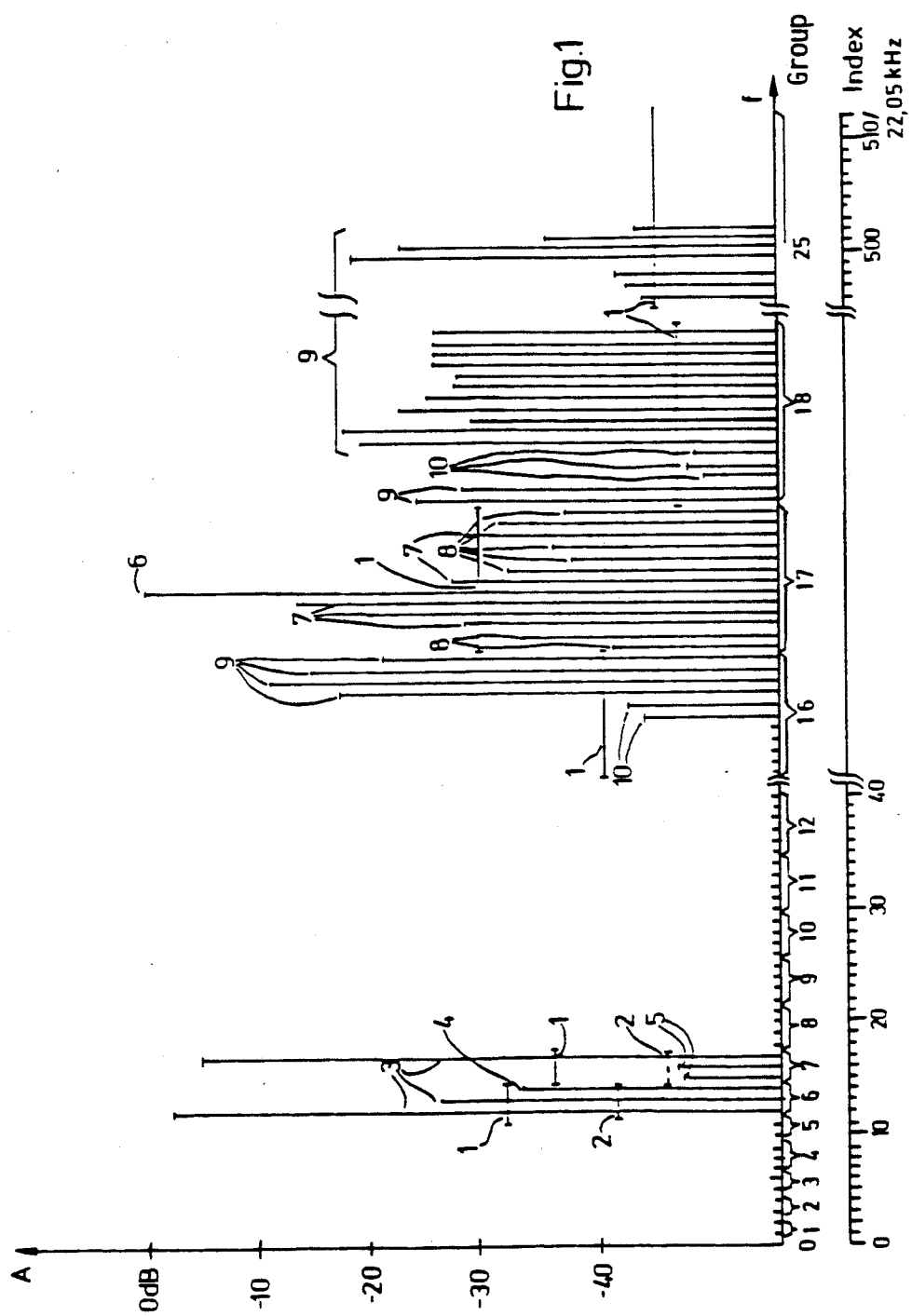
FIG. 1 is a graph of the amounts of a block of an audio signal transformed into the frequency domain.
Figure 3:
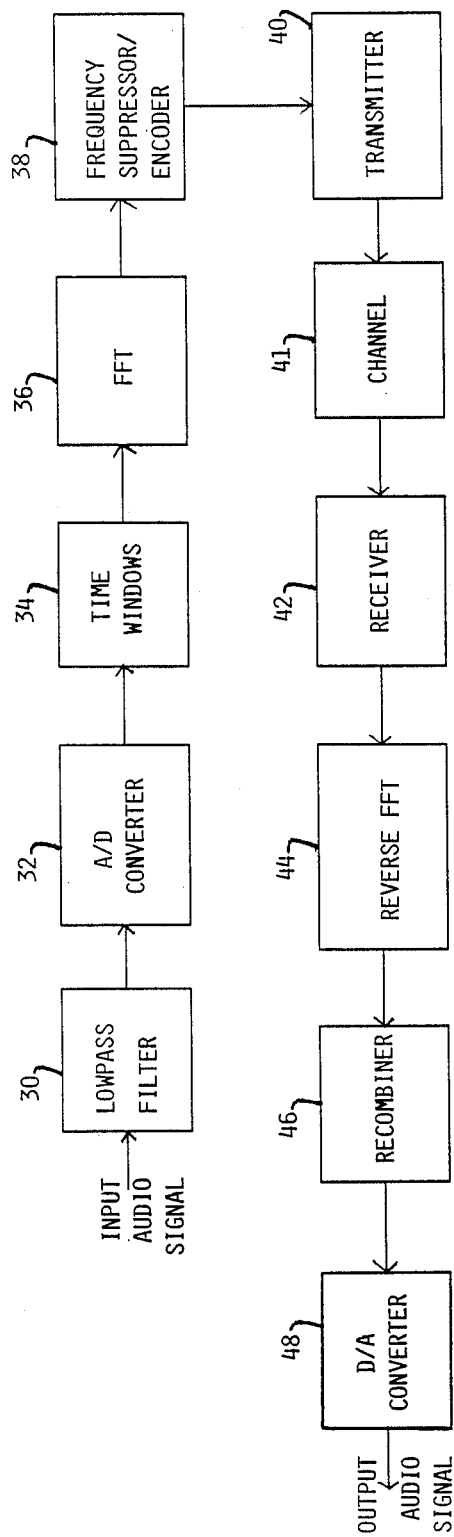
FIG. 3 a block circuit diagram of an arrangement for carrying out the invention.

The signal shown in FIG. 1 results from a circuit arrangement as shown schematically in FIG. 3 in which a lowpass audio signal filtered by lowpass filter 30 is converted to a digital signal by an analog/digital converter 32, a time window 34 outs certain, preferably 20 ms, sections of the digital audio signal out of the long-term signal and the resulting blocks are transformed by a fourier transform circuit 36 from the time domain into the frequency domain, similarly to the procedures followed in the method disclosed in DE OS No. 3,506,912.

Following the transformation, certain frequency components are suppressed by suppressor encoder, e.g., computer, 38 in a manner to be described below. The remaining signal is transmitted by a transmitter 40 over channel 41 to a receiver 42 and is then transformed back to the time domain by transformer 44 and respective time sections recombined to a continuous digital signal in recombiner 46 before being converted back to an analog signal by D/A connector 48.

In the illustrated embodiment, the frequency axis is divided into 513 loci having the indexes 0...512, which can be associated with spectral components. A plurality of these loci are combined preferably in the manner as described in DE-OS No. 3,506,912into frequency groups of which there are a total of 26. The number of loci for spectral components in the individual frequency groups g differs and increases from low frequency groups to higher frequency groups.

Due to the large number of loci, the graph plotted over the frequency axis is not to scale. Only those regions are shown in an expanded manner which are of significance for an explanation of the solution according to the invention. Shown is the frequency range below somewhat more than 1 kHz, here represented by groups 0 to 12, and the remaining frequency range from which, as an example, groups 16, 17 and 18 have been selected.

The amounts of the spectral components are logarithmed on the ordinate and are related to the value of the absolute maximum (which is given a dB value of zero). The spectrum shown in the drawing is a short-term spectrum whose spectral-lines are produced, on the one hand, by the original signal and, on the other hand, also by blockwise transformation, i.e. by folding the signal function with the transform of the time window function. The spectral lines additionally produced by the blockwise transformation are also of significance for obtaining a true image of the original signal after transmission and retransformation of the signal from the frequency domain into the time domain.

To save transmission or memory capacity during transmission or storage, respectively, the procedure in the past has been to leave unconsidered or suppress, e.g. set back to a very low amount or to zero, all those spectral components below a threshold 1, According to the psycho-acoustic effect of masking, this threshold could be in the range of 26 to 30 dB. It has been realized that this leads to unsatisfactory results. Therefore, in the method disclosed in DE-OS No. 21 513 the thresholds are calculated by determining in each group g separately the logarithm ratio of the effective value of the maximum amount value to the square root of the mean energy of all spectral components of this group, multiplied by a factor of approximately 3. This factor has been determined by experiments and can lie in a range between 2 to 5. The calculated range of the threshold is then limited to a minimum of 30 dB in order not to be below the range given by the psycho-acoustic effect of masking. This leads to a variation range of the first threshold over all groups g, of 30 to 70 dB. However, this may lead to unsatisfactory results if the unconsidered spectral components were additionally produced by blockwise transformation. Since these cannot be distinguished from other spectral components. the method is performed by suppressor 38, modified in the following manner, in deviation from the general non-consideration or suppression of spectral components below a threshold 1.

In the range below about 1 kHz, i.e. herein groups 1 to 10, an additional threshold 2 is defined which lies below threshold 1, preferably 10 dB below it. If spectral components, e.g. the spectral components marked 3, lie above threshold 1, they are coded and transmitted. If they lie below threshold 1 but still above threshold 2, as is the case for spectral component 4, they are also transmitted. Only the spectral components marked 5, which also lie below threshold 2, are suppressed.

A further modification takes place in the immediate vicinity of the absolute maximum of the amount values of the spectrum. In the spectrum here serving as an example, the spectral component having the highest amount value 6 belongs to group 17. Independently of the fact whether the adjacent spectral components 7 and 8 lie above threshold 1, as is the case for spectral components 7, or below threshold 1, as is the case for spectral components 8, they are not suppressed. This applies regardless to which group g spectral component 6 belongs which has the absolute maximum of the amplitude value. Even if this is the case in the frequency range of groups 0 to 10, the spectral components are not suppressed.

In the subsequent lower or upper groups 16 and 18,however, the spectral components lying above threshold 1, here marked 9, are transmitted and the spectral components 10 below the threshold are suppressed.

Figure 2:
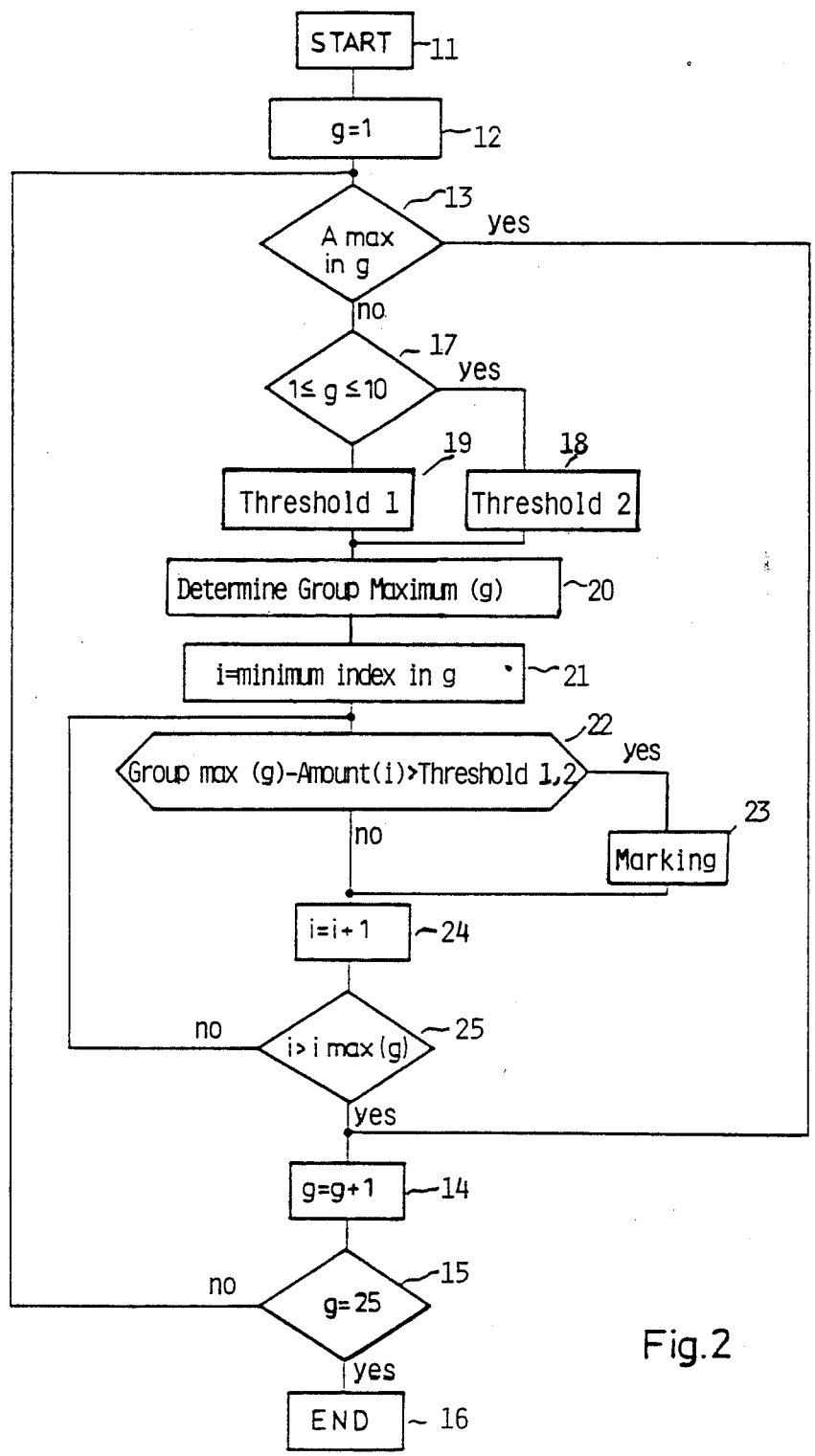
FIG. 2 is a flow diagram to illustrate the method according to invention.

The method is advisably executed with the same computer with which transformation and coding are effected. To describe the method steps, reference is made to FIG. 2 which is a flow diagram. After the start in step 11, the group having the group number $g = 1$ is addressed. Group $g = 0$ takes on a special position since it represents the dc - value of the short-term spectrum and is of no further significance for the execution of the method. In step 13, a decision is now made whether the examined group 9 contains the absolute maximum of the amount value. If that is the case, the spectral components disposed in this group are not suppressed but are instead branched off to step 14, the group number to be examined is changed to the next following number and a decision is made at step 15 whether all groups have been examined. If this is the case, the examination for the block in question is terminated and routine step 16 is completed. For the recovery of the next block, the system then jumps back to start 11 step and the routine begins anew.

If this is not the case, i.e., the group being examined does not contain the absolute maximum, a jump back to step 13 is made and it is determined whether the group g now being examined contains the absolute maximum. If the group g does not contain the absolute maximum, a check is made in step 17 whether the group being examined lies in the range of ordinals from 1 to 10. If this is the case, the threshold is established to be threshold 2 in step 18 for nonconsideration or suppression of the spectral components, this threshold lying 10 dB lower than threshold 1. If the group lies outside of the range of groups 1 to 10, threshold 1 in step 19 is established for nonconsideration or suppression of spectral components.

In step 20, the group maximum, i.e. the spectral component of the maximum amount value in the same group, is now determined for the group being examined. Then a check is made of the further spectral components of this group. For this purpose, the spectral components having the lowest index within the group g presently being examined is examined in step 21. A check is made in step 22 whether the spectral component lies below the appropriate threshold 1 or 2. This check is made under consideration of the group maximum. For this purpose, the difference is formed of the group maximum and the amount of the respective spectral component. If the difference is greater than the threshold, i.e. if the spectral component lies below threshold 1 or 2, the spectral-component is marked for suppression in step 23. In the other case, no marking takes place.

In step 24, the index of the spectral component presently being examined is moved on by 1 and in step 25 it is determined whether the index i is greater than the maximum index of the group. If this is not the case, the next group 9 is addressed. If it is the case, the spectral component with the next index is examined in the same manner.

After examination of the spectral components with index 512 in group 25 the examination is completed, as already mentioned, and during the now following coding of the transformed signal blocks the marked spectral components are suppressed correspondingly. If the next transformed signal block is present, the process begins anew at start step 11.

It will be understood that the above description of the present invention is susceptible to various modifications, changes and adaptations, and the same are intended to be comprehended within the meaning and range of equivalents of the appended claims.

What is claimed is:

1. A method of transmitting an analog audio signal in digital form to be reconverted to analog form, comprising the steps of:
    converting an analog audio signal to a first digital signal;
    dividing the first digital signal in time segments;
    converting divided portions of the first digital signal in the respective time segments into respective second digital signals representing the respective short-term spectrums of the time segments;
    encoding the second digital signals for transmission while omitting from encoding portions of said second signals having signal levels which lie below given thresholds having values based on the psycho-acoustic law of masking, and such that the portions of the second signals having signal levels which are below the thresholds and are thus omitted, represent the frequency components of the short-term spectrum outside of at least one psycho-acoustically differentiable frequency range; and
    transmitting the encoded second signals.

2. A method as in claim 1, wherein the at least one psycho-acoustically differentiable range includes the frequency range in the vicinity of the absolute maximum level of the short-term spectrum.

3. A method as in claim 2, wherein all frequency components in the frequency range in the vicinity of the absolute maximum level of the short-term spectrum are encoded.

4. A method as in claim 2, wherein frequency components which are in the frequency range in the vicinity of the absolute maximum level of the short-term spectrum, and which have levels below the threshold, are encoded.

5. A method in claim 1, wherein the at least one psycho-acoustically differentiable range includes the frequency range in the vicinity of the absolute maximum level of the short-term spectrum.

6. A method as in claim 5, wherein the entire frequency range of the short-term spectrum is divided into frequency groups which each include at least one spectral component and wherein the thresholds are defined individually for each group and separately related to the maximum level of the spectral components of the each group, and wherein the frequency range formed by the vicinity of the absolute maximum level of the short-term spectrum coincides with the frequency range taken up by the group which includes the absolute maximum level.

7. A method as in claim 1, wherein the entire frequency range of the short-term spectrum is divided into frequency groups which each include at least one spectral component and wherein the thresholds are defined individually for each group and separately related to the maximum level of the spectral components of the each group.

8. A method as in claim 7, wherein the thresholds are defined by the logarithmed ratio of the effective value of the maximum level of the spectral components of each group to the square root of the mean energy of all spectral components of the each group, multiplied by a constant factor.

9. A method as in claim 8, wherein the constant factor is approximately three.

10. A method as in claim 9, wherein the first threshold is limited to a variation range of the logarithm ratio, of 30 dB to 70dB.

11. A method as in claim 8, wherein the first threshold is limited to a variation range of the logarithm ratio, of 30 to dB to 70 dB.

12. A method as in claim 1, wherein the thresholds are defined according to the psycho-acoustic law of masking such that the omitted portions of the second signals are those not decernable by the human ear.

13. A method as in claim 1, further comprising the steps of
    predicting what psycho-accoustically differentiable frequency range or ranges of the short -term spectrum contain frequency components added thereto during said step of converting, and
    selecting as the at least one psycho-accoustically differentiable frequency range, the range or ranges predicted during said step of predicting.

14. A method of transmitting an analog audio signal in digital form to be reconverted to analog form, comprising the steps of:
    converting an analog audio signal to a first digital signal;
    dividing the first digital signal in time segments;
    converting divided portions of teh first digital signal in the respective time segments, the entire frequency range digital signals representing the respective short-term spectrums of the time segments, the entire frequency range of the short-term spectrum being divided into psycho-accoustically differentiable frequency groups which each include at least one spectral component;
    establishing a first threshold individually for each group, the first threshold for each group being defined by the logarithmed ratio of the effective value of the maximum level of the spectral components of the group to the square root of the mean energy of all spectral components of the group, multiplied by a constant factor, establishing for each group having a spectral component in a frequency range below a given frequency, a second threshold which is lower than the first threshold established for the group;

encoding the second digital signals for transmission while in the groups having spectral components in the frequency ranges above the given frequency, omitting from encoding portions of the second signals which lie below the first thresholds and including in the encoding portions which lie above the second thresholds, and in the groups having spectral components in the frequency ranges below the given frequency, further omitting from encoding portions of the second signals which lie below the second thresholds and including in the encoding portions which lie above the second thresholds; and transmitting the encoded second signals.

15. A method as in claim 14, wherein the the predetermined frequency is 1khz.

16. A method as in claim 15, wherein the second threshold lies 10 db below the first threshold.

17. A method as in claim 14, wherein the constant factor is between 2 and 5.

18. A method as in claim 17 wherein the constant factor is equal to approximately 3.

19. A method as in claim 14, wherein the first threshold is limited to a variation range of the logarithm ratio, of 30 to dB to 70 dB.

20. A method as in claim 19, wherein the second threshold view 10 db below the first threshold.

21. A method as in claim 14, further comprising the step of including in the encoded portions all spectral components lying within a partial frequency range in a vicinity of the frequency component having the absolute maximum level of the short-term spectrum.

22. A method as in claim 14, further comprising the step of including in the encoded portions spectral components lying within a partial frequency range in a vicinity of the frequency component having the absolute maximum level of the short-term spectrum, wherein the spectral components lying within the partial frequency range and which are encoded have levels above and below the first threshold.

23. A method as in claim 22, wherein the given frequency is 1khz, the second threshold lies 10 db below the first threshold and the constant factor is between 2 and 5.

24. A method of transmitting an analog audio signal in digital form to be reconverted to analog form, comprising the steps of:

converting an analog audio signal to a first digital signal;

dividing the first digital signal in time segments; converting divided portions of the first digital signal in the respective time segments into respective second digital signals representing the respective short-term spectrums of the time segments;

encoding the second digital signals for transmission while omitting from encoding portions of said second signals having signal levels which lie below given thresholds having values based on the psycho-acoustic law of masking, and such that the portions of the second signals having signal levels which are below the thresholds and are thus omitted, represent the frequency components of the short-term spectrum outside of a psycho-acoustically differentiable frequency range which includes spectral components in a vicinity of the frequency component having the absolute maximum level of the short-term spectrum, one of the thresholds being defined in the psycho-acoustically differentiable frequency range said step of encoding including the step of encoding the spectral components which lie within the psycho-acoustically differentiable frequency range and which have signal levels above and below the one of the thresholds and transmitting the encoded second signals.

* * * * *